Patented Oct. 9, 1934

1,976,222

UNITED STATES PATENT OFFICE 1,976,222

METHOD OF PURIFYING RAW SALT

Ryosaburo Hara, Sendai, Japan, assignor to Asahi Garasu Kabushiki Kaisha (Asahi Glass Co., Ltd.), Tokyo, Japan No Drawing. Application June 13, 1933,
Serial No. 675,581

2 Claims. (Cl. 23—44)

This invention relates to a method of purifying raw salt by using liquid ammonia as a solvent.

To carry out this invention into practice, raw salt is mixed with and stirred in liquid ammonia under pressure and preferably at a temperature below 0° C. to dissolve sodium chloride in liquid ammonia as itself or ammonia compound. Sulphates of sodium, calcium and magnesium, chlorides of calcium and magnesium, all common impurities in raw salt, are insoluble in liquid ammonia as themselves or ammonia compounds. These substances and muddy materials can easily be separated from solution by filtering them through adequate filtering bed, or by decantation. The filtrate, which contains only pure sodium chloride, is then evaporated to crystallize the whole salt as a solid form, and the evaporated ammonia may be recovered without any loss and liquefied for the next use.

As the solubility curve of sodium chloride in liquid ammonia has a negative coefficient at the temperature above —10° C., the filtered solution (the primary filtrate) may be heated to a higher temperature to recrystallize the greater part of sodium chloride and again be filtered. This secondary filtrate contains only a small quantity of sodium chloride and therefore can be used as the initial solvent in the process. The crystallized salt adsorbs some ammonia. To take the trace of ammonia from the crystal, the latter is heated to 150–200° C. under vacuum for an hour or two.

If it is desired to utilize the ammonia solution of pure sodium chloride, the above primary filtrate is prepared for use.

This method of purification may be easily applied to Solvay process of manufacturing soda ash from sodium chloride as follows:—The above primary filtrate is evaporated to some extent, so that the crystallized sodium chloride may contain the necessary amount of free ammonia. Then, the calculated quantity of water is introduced and stirring is continued to dissolve all sodium chloride and ammonia at the necessary temperature. This solution is used directly for the precipitation of sodium bicarbonate in the Solvay factory.

Thus, with the simple processes of dissolving, filtering and evaporating, raw salt may be purified effectively for all purposes.

The insoluble mud containing impure, but useful substances is heated to drive away ammonia and is used for the preparation of salts such as magnesium chloride.

The following are examples of carrying out this method into practice:—

(1) 190 parts of raw solar salt (87% NaCl, 0.8% $MgCl_2$, 0.6% $MgSO_4$, 0.5% $CaSo_4$) are introduced into 1,000 parts of liquid ammonia under pressure, cooled to about —7° C. and stirred for an hour. About 99% of sodium chloride in the raw material can be easily dissolved in the solution, and then all impurities are separated from the solution by filtration with a suitable filtering medium. At this temperature, sodium chloride is dissolved in liquid ammonia as NaCl, and if this operation is maintained at a temperature below —10° C., ammonia compound of sodium chloride, $NaCl \cdot xNH_3$, is produced. As this compound is less soluble than sodium chloride in liquid ammonia, it is preferable to treat salt above —10° C.

The filtrate thus obtained is heated for evaporation, finally leaving 160 parts of pure solid sodium chloride. The evaporated ammonia is recovered without loss and liquefied by means of ammonia compressor for the next use.

(2) The clear filtrate as described in (1) is heated to about 30° C. to recrystallize the greater portion of sodium chloride. The inventor has found that at this temperature the solubility of sodium chloride in liquid ammonia is 32 gr./Kg. $NH_3$. Therefore, by separating crystal from the solution, it is possible to obtain about 130 parts of solid sodium chloride as the fine crystal free from moisture. The filtrated weak solution of sodium chloride is circulated as a purifying agent for the next use.

I claim:

1. A method of purifying raw salt by dissolving sodium chloride in liquid ammonia under pressure at a temperature between 0° C. and —10° C. removing insoluble impurities by filtration and evaporating the clear solution to separate pure sodium chloride as a crystal form and again filtering the solution from pure crystal.

2. A method of purifying raw salt by dissolving sodium chloride in liquid ammonia under pressure and preferably at a temperature below 0° C., removing insoluble impurities by decantation and heating the solution at above 30° C. to recrystallize sodium chloride.

RYOSABURO HARA.